United States Patent
Breon et al.

(10) Patent No.: US 12,104,086 B2
(45) Date of Patent: *Oct. 1, 2024

(54) PAINT REMOVER COMPOSITION AND METHOD OF MAKING

(71) Applicant: W. M. BARR & COMPANY, INC, Memphis, TN (US)

(72) Inventors: Jonathan P. Breon, Memphis, TN (US); Timothy G. Teague, Nesbit, MS (US); Dennis Earl Shireman, Marion, AR (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,569

(22) Filed: Oct. 31, 2023

(65) Prior Publication Data

US 2024/0059914 A1 Feb. 22, 2024

Related U.S. Application Data

(63) Continuation of application No. 17/339,446, filed on Jun. 4, 2021, now Pat. No. 11,827,812, which is a continuation-in-part of application No. 16/011,164, filed on Jun. 18, 2018, now Pat. No. 11,708,502.

(60) Provisional application No. 62/522,417, filed on Jun. 20, 2017.

(51) Int. Cl.
*C09D 9/00* (2006.01)

(52) U.S. Cl.
CPC .................... *C09D 9/005* (2013.01)

(58) Field of Classification Search
CPC . C09D 9/005; C09D 9/04; C09D 7/43; C09D 5/024; C09D 5/021; C09D 11/033; C09D 5/08
USPC ........................................................ 510/201
See application file for complete search history.

(56) References Cited

U.S. PATENT DOCUMENTS

| | | |
|---|---|---|
| 2,551,634 A | 5/1951 | Price |
| 3,321,407 A | 5/1967 | Rosenfeld |
| 3,324,037 A | 6/1967 | Resenfeld |
| 4,854,973 A | 8/1989 | Holdar |
| 5,308,527 A * | 5/1994 | Lallier .................. C09D 9/005 510/501 |
| 5,403,402 A | 4/1995 | LeGrow |
| 5,744,437 A | 4/1998 | Rowe et al. |
| 5,780,409 A | 7/1998 | Distaso |
| 5,792,223 A | 8/1998 | Rivas et al. |
| 5,994,282 A * | 11/1999 | Lallier .................. C09D 9/00 510/202 |
| 6,017,862 A * | 1/2000 | Doyel .................. C11D 7/5013 510/176 |
| 6,159,915 A | 12/2000 | Machac, Jr. et al. |
| 6,171,346 B1 | 1/2001 | Yeazell et al. |
| 6,200,940 B1 | 3/2001 | Vitomir |
| 6,395,103 B1 | 5/2002 | Machac, Jr. et al. |
| 6,673,157 B1 | 1/2004 | McKim et al. |
| 6,699,829 B2 | 3/2004 | Doyel et al. |
| 6,833,345 B2 | 12/2004 | Machac, Jr. et al. |
| 7,449,437 B2 | 11/2008 | Gross et al. |
| 8,119,588 B2 | 2/2012 | Bernhardt et al. |
| 8,309,502 B2 | 11/2012 | Quillen et al. |
| 9,156,809 B2 | 10/2015 | Rieth et al. |
| 9,455,447 B2 | 9/2016 | Thillaiyan et al. |
| 9,458,414 B2 | 10/2016 | Rieth et al. |
| 9,868,867 B1 * | 1/2018 | Manley ................. C09D 9/005 |
| 10,717,885 B2 | 7/2020 | Morose et al. |
| 11,708,502 B2 | 7/2023 | Hawes et al. |
| 11,827,812 B2 | 11/2023 | Breon et al. |
| 2004/0058832 A1 | 3/2004 | Shank et al. |
| 2004/0058833 A1 | 3/2004 | Gross et al. |
| 2006/0089281 A1 | 4/2006 | Gibson et al. |
| 2006/0258555 A1 * | 11/2006 | Filippini ................. C09D 9/04 510/417 |
| 2007/0101902 A1 | 5/2007 | Gross et al. |
| 2007/0264175 A1 | 11/2007 | Iverson et al. |
| 2008/0139437 A1 * | 6/2008 | Power .................... C09D 9/005 510/208 |
| 2010/0104947 A1 | 4/2010 | Choi et al. |
| 2010/0273696 A1 | 10/2010 | Hoptstock |
| 2010/0276149 A1 | 11/2010 | Pope et al. |
| 2012/0128614 A1 | 5/2012 | Rieth et al. |
| 2015/0014223 A1 | 1/2015 | Fan et al. |
| 2016/0040071 A1 | 2/2016 | Fan et al. |
| 2017/0042784 A1 | 2/2017 | Munk et al. |
| 2019/0106657 A1 | 4/2019 | Hawes et al. |
| 2019/0169550 A1 | 6/2019 | Hunt, Jr. et al. |
| 2019/0330481 A1 | 10/2019 | Teague et al. |
| 2020/0399480 A1 | 12/2020 | Byrd |

FOREIGN PATENT DOCUMENTS

| | | |
|---|---|---|
| CH | 670832 A5 | 7/1989 |
| DE | 19526351 A1 | 1/1997 |
| JP | H1053734 A | 2/1997 |
| JP | H105374 A * | 2/1998 |
| WO | 2003062325 A2 | 7/2003 |
| WO | 2018039415 A1 | 3/2018 |
| WO | 2018236782 A1 | 12/2018 |

OTHER PUBLICATIONS

Notice of Allowance for corresponding Canadian Application No. 3,065,34; Issued Mar. 15, 2024 (1 Page).
Non-Final Office Action issued for U.S. Appl. No. 18/385,600; dated May 9, 2024; (7 pages).
Notice of Allowance for U.S. Appl. No. 18/385,600; Issued Aug. 12, 2024 (7 Pages).

* cited by examiner

*Primary Examiner* — Eisa B Elhilo
(74) *Attorney, Agent, or Firm* — Shumaker, Loop & Kendrick, LLP

(57) ABSTRACT

A composition for paint removal and methods of making and of using the composition are provided. The composition comprises tetrahydrofuran (THF), an amine with a molar volume of <100 cm³/mol, and a solvent.

20 Claims, No Drawings

PAINT REMOVER COMPOSITION AND METHOD OF MAKING

CROSS-REFERENCE TO RELATED APPLICATION

This application is a continuation application which claims priority to U.S. Ser. No. 17/339,446, filed on Jun. 6, 2021, which is a continuation-in-part application which claims priority from U.S. patent application Ser. No. 16/011, 164, filed Jun. 18, 2018, which claims priority from U.S. provisional patent application No. 62/522,417, filed on Jun. 20, 2017, in the United States Patent and Trademark Office. The disclosures of which are incorporated herein by reference in their entireties.

FIELD OF THE INVENTION

The present invention generally relates to paint removers.

BACKGROUND OF THE INVENTION

Most consumers use paint removers, also commonly referred to as paint strippers, for refinishing antique furniture, or woodworking's (doors, frames, moldings, etc.) in older houses. Many of these items have been painted, and repainted many times over the years. This results in items having multiple layers of paint containing different chemistry types and a different degree of difficulty from being removed. Paint removers are also used in the auto body repair industry to help with vehicle restoration.

Currently methylene chloride and N-Methylpyrrolidone (NMP) are used in the majority of paint removers in the United States. Methylene chloride has been the preferred solvent for use in paint removers for seventy years. Before methylene chloride was introduced, most paint removers consisted of volatile flammable solvents. Paint removers formulated with volatile solvents are extremely flammable and the flammability of these paint removers resulted in fires causing injury and deaths. These paint removers were rapidly replaced with the methylene chloride paint removers because methylene chloride paint removers can be formulated to be non-flammable and are effective in removing multiple layers of paint. The physical characteristics give the methylene chloride molecule the ability to quickly penetrate multiple layers and to soften or dissolve chemically resistant coatings. Methylene chloride does not deplete the ozone layer and is considered to make negligible contributions to smog formation, the green-house effect and acid rain. Like other organic solvents, methylene chloride can be harmful to human health if used improperly.

However, regulations are changing to remove methylene chloride and NMP from the environment. For example, the US Environmental Protection Agency (EPA) is considering a range of possible voluntary and regulatory actions to address risks from the use of methylene chloride-containing paint and coating removal products.

According to the EPA, NMP is both produced and imported into the United States, with use estimated at over 184 million pounds per year. EPA estimates that approximately 9 percent of total NMP usage is for paint and coating removal products.

On Jan. 12, 2017, EPA issued a proposed rule under section 6 of the Toxic Substances Control Act with two proposed approaches for regulating NMP. According to the EPA, one approach is to prohibit the manufacture (including import), processing, and distribution in commerce of NMP for consumer and commercial paint and coating removal; to prohibit commercial use of NMP; and to require manufacturers, processors, and distributors, except for retailers, of NMP to provide downstream notification of these prohibitions throughout the supply chain; and to require limited recordkeeping. According to the EPA, the second approach is a combination of requirements to address unreasonable risks to workers and consumers including to limit the amount of NMP in paint removal products to no more than 35 percent by weight; require formulators to evaluate and identify specialized gloves that protect against skin absorption; require occupational users to have worker protection programs to require that workers wear personal protective equipment to prevent skin and inhalation exposures, require hazard communication for commercial users; and require warning labels for consumers with detailed information on proper ways to reduce exposure.

Thus, there is a need for an alternative paint remover that is effective.

SUMMARY OF THE INVENTION

The present invention generally relates to a paint remover composition and method of making.

In an embodiment of the invention, a paint remover composition comprising tetrahydrofuran (THF) is provided.

In an embodiment of the invention, a paint remover composition comprising a combination of THF and a solvent is provided.

In an embodiment of the invention, the composition comprises: tetrahydrofuran (THF), an amine with a molar volume of <100 $cm^3$/mol, and a solvent.

In an embodiment of the invention, the solvent is selected from the group consisting of aromatic, aliphatic, cycloaliphatic, alcohol, glycol ether—benzene, xylene, toluene, dimethyl benzene, ethylbenzene, aliphatic hydrocarbon with 5 carbon or more, cycloaliphatic hydrocarbon with 5 carbon or more, methanol, ethanol, n-propanol, i-propanol, n-butanol, i-butanol, s-butanol, amyl alcohol, ethyleneglycol monomethylether, ethyleneglycol monoethylether, ethyleneglycol monopropylether, ethyleneglycol monobutyl ether, ethyleneglycol monohexylether, phenoxyethanol, propylene glycol monomethyl ether, propylene glycol monoethyl ether, propylene glycol monopropyl ether, propylene glycol monobutylether, propyleneglycol phenyl ether, diethyleneglycol monomethylether, diethyleneglycol monoethylether, diethyleneglycol monopropylether, diethyleneglycol monobutylether, diethyleneglycol monohexylether, diethyleneglycol phenylether, dipropyleneglycol monomethyl ether, dipropyleneglycol monoethyl ether, dipropyleneglycol monopropyl ether, dipropyleneglycol monobutyl ether, dipropyleneglycol phenyl ether, dipropyleneglycol dimethylether, tripropyleneglycol monomethyl ether, tripropyleneglycol monobutylether, ethylene glycol, propylene glycol, glycerol, propanediol, butanediol, 2-methylpropanediol, and a combination thereof.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

DESCRIPTION OF THE PREFERRED EMBODIMENTS

The following description of the embodiments of the present invention is merely exemplary in nature and is in no way intended to limit the invention, its application, or uses. The present invention has broad potential application and utility. The following description is provided herein solely by way of example for purposes of providing an enabling disclosure of the invention, but does not limit the scope or substance of the invention.

In an embodiment of the invention, a paint remover composition comprising tetrahydrofuran (THF) is provided. Preferably, THF and at least one other solvent are used in combination.

In an embodiment of the invention, THF and acetone are used in combination in the composition for paint removal. It has surprisingly been found that there is an unexpected synergy between THF and acetone in removing dried paint from a painted surface.

In an embodiment of the invention, THF and acetone are preferably used in combination in a range of 4 weight % to 90 weight % THF and 4 weight % to 90 weight % acetone. THF and acetone can be used in a combination in a range of 4 weight % to 75 weight % of THF and 4 weight % to 75 weight % of acetone. THF and acetone can be used in a combination in a range of 4 weight % to 50 weight % of THF and 4 weight % to 50 weight % of acetone.

Other components may be present in the formulation for paint removal. Non-limiting examples of other such components include, but are not limited to, dye, paraffin wax, antioxidant, surfactant, thickener, fumed silica, corrosion inhibitor, ammonia, peroxide inhibitor (including but not limited to butylated hydroxytoluene), or a combination thereof.

Amine containing corrosion inhibitors include, but are not limited to, primary, secondary, tertiary or quaternary amines, aliphatic, cycloaliphatic or aromatic amines, polyamines, amine salts, such as amine-mineral acid salts, amine-nitrites, amine-carboxylates, amine-phosphates, amine-borates, alkanolamines or alkanolamine-borate complexes, amine-metal complexes, amine containing heterocycles, azoles, and mixtures thereof.

Other components, alone or in combination, may be added in a range of 0 weight % to 25 weight %, more preferably 0.01 weight % to 12.5 weight %.

In an embodiment of the invention, THF and dimethyl sulfoxide (DMSO) are used in combination in the composition for paint removal. It has surprisingly been found that there is an unexpected synergy between THF and DMSO solvents in removing dried paint from a painted surface. THF and DMSO may be used along with acetone. The paint remover composition of the present invention is suitable for chemically stripping paint of various kinds on various surfaces.

In an embodiment of the invention, THF and DMSO are preferably used in combination in a range of 4 weight % to 90 weight % THF and 4 weight % to 90 weight % DMSO. THF and DMSO can be used in combination in a range of 20 weight % to 75 weight % of THF and 20 weight % to 75 weight % of DMSO. THF and DMSO can be used in combination in a range of 4 weight % to 45 weight % of THF and 4 weight % to 45 weight % of DMSO. The weight percentages are based on the total weight percentage of the composition.

In an embodiment of the invention, a composition for paint removal is provided. The paint remover composition generally comprises: 4 weight % to 45 weight % DMSO, 4 weight % to 45 weight % THF or other solvent, 0.5 weight % to 2 weight % cellulose ether thickener, 40 weight % to 60 weight % acetone, 0.2 weight % to 1.0 weight % paraffin, 0 weight % to 2 weight % nonionic surfactant, and 0 weight % to 5 weight % of a primary, secondary or tertiary amine, wherein the weight percentages are based on the weight of the total composition.

A solvent is a single solvent or a combination of solvents. In an embodiment of the invention, the solvent is selected from the group consisting of aromatic, aliphatic, cycloaliphatic, alcohol, glycol ether—benzene, xylene, toluene, dimethyl benzene, ethylbenzene, aliphatic hydrocarbon with 5 carbon or more, cycloaliphatic hydrocarbon with 5 carbon or more, methanol, ethanol, n-propanol, i-propanol, n-butanol, i-butanol, s-butanol, amyl alcohol, ethyleneglycol monomethylether, ethyleneglycol monoethylether, ethyleneglycol monopropylether, ethyleneglycol monobutyl ether, ethyleneglycol monohexylether, phenoxyethanol, propylene glycol monomethyl ether, propylene glycol monoethyl ether, propylene glycol monopropyl ether, propylene glycol monobutylether, propyleneglycol phenyl ether, diethyleneglycol monomethylether, diethyleneglycol monoethylether, diethyleneglycol monopropylether, diethyleneglycol monobutylether, diethyleneglycol monohexylether, diethyleneglycol phenylether, dipropyleneglycol monomethyl ether, dipropyleneglycol monoethyl ether, dipropyleneglycol monopropyl ether, dipropyleneglycol monobutyl ether, dipropyleneglycol phenyl ether, dipropyleneglycol dimethylether, tripropyleneglycol monomethyl ether, tripropyleneglycol monobutylether, ethylene glycol, propylene glycol, glycerol, propanediol, butanediol, 2-methylpropanediol, and a combination thereof.

In an embodiment, the solvent is selected from the group consisting of THF, toluene, DMSO, dioxalane, 1,2 trans dichloroethylene, and a combination thereof. The solvent may be a combination of THF and DMSO. THF and DMSO in combination have found to have a synergistic effect in a paint remover.

Other solvent combinations demonstrating a synergistic effect in a paint remover include, but are not limited to, THF and DMSO; toluene and DMSO; Dioxalane and DMSO; 1,2 trans dichloroethylene and DMSO; and a combination thereof.

In an embodiment of the present invention, the composition comprises tetrahydrofuran (THF), an amine with a molar volume of <100 cm$^3$/mol, and a solvent.

The tetrahydrofuran (THF) may be present in an amount of 50 weight % to 90 weight %, wherein the weight percentages are based on the weight of the composition. The amine may be present in an amount of 1 weight % to 10 weight %, wherein the weight percentages are based on the weight of the composition. The solvent may comprise a hydrocarbon. The solvent may be an alcohol or a glycol ether.

The composition may comprise water. The water may be present in an amount up to 20 weight %, wherein the weight percentages are based on the weight of the composition.

The molar volume of the amine may be <100 cm$^3$/mol. The molar volume of the amine may be <30 cm$^3$/mol. The amine is selected from the group consisting of ammonia, hydroxylamine, dimethylamine, ethanolamine, pyrrolidine, and a combination thereof.

The composition may comprise a solvent evaporation retarder such as a paraffin wax. The composition may comprise a cellulosic thickener. Non-limiting examples of cellulosic thickeners are hydroxypropyl methyl cellulose, hydroxypropyl cellulose, and a combination thereof. The composition may comprise an amine containing corrosion inhibitor.

EXAMPLES

Example 1

Paint stripping tests were conducted in accordance with the present invention. The paint stripping test used a proposed formula in accordance with the present invention in which a solvent was varied in the tests. Stripping ability was measured after 15 and 30 minutes by scraping layers of paint off a board using a plastic scraper. Scraping was made at a low angle from the board without using pressure that would dig into the paint. The purpose was to see how much paint would remove with ease in the test in order to more accurately evaluate the effect of the chemical solvent on the paint without agitation (other than to remove the loosened and softened paint layers and not layers beneath that have not reacted to the stripper in the time period allowed).

The paint panel was prepared as follows using Rust Oleum's Oil based paints:
First layer=Blue
Second layer=White
Third layer=Green
Fourth layer=Yellow
Fifth layer=Red The fifth layer was the top layer, and there were five layers in total. Each layer set for one 24 hour period before the next layer. Each coat of paint was rolled on in a usual manner using a standard 6" long paint roller with a ¼" nap. After the last application of paint, the boards were placed at 50 C for 30 days in order to cure further.

The stripper formulation tested is set forth in Table 1:

TABLE 1

| | |
|---|---|
| 10.0 weight % | toluene |
| 0.8 weight % | paraffin wax (127° F. melting point) |
| 1.25 weight % | cellulose ether thickener (Tylose PS0810001) |
| 29.5 weight % | solvent (varied for testing purposes) |
| 46.95 weight % | acetone |
| 10.0 weight % | methanol |
| 0.5 weight % | nonionic surfactant (Tomadol 900) |
| 1.0 weight % | Aqua Ammonia (26 Deg. Baume) |

Note that weight percentages are based on the total weight of the formulation.

The solvents tested were:
(1) Dimethyl sulfoxide (DMSO), (2) toluene, (3) 1,2 trans dichloroethylene, (4) Dioxalane, and (5) Tetrahydrofuran (THF).

The order of performance, greater to lower, of these 5 solvents were as follows with THF being the greater and 1,2 transdichloroethylene being the lower:
THF
Toluene
Dioxalane
DMSO
1,2 transdichloroethylene Blends of the experimental solvents were also tested. The base blend for these experiments was:

TABLE 2

| | |
|---|---|
| 24.75 weight % | DMSO |
| 24.75 weight % | solvent (varied for testing purposes) |
| 1.25 weight % | cellulose ether thickener (Tylose) |
| 46.95 weight % | acetone |
| 0.8 weight % | paraffin |

TABLE 2-continued

| | |
|---|---|
| 0.5 weight % | nonionic surfactant (Tomadol 900) |
| 1.0 weight % | aqua ammonia |

Note that weight percentages are based on the total weight of the formulation

The stripping test results were visually inspected after setting 15 and 30 minutes.

All of the blends tested demonstrated synergy; however, the THF/DMSO combination was the best performing synergistic blend. The order of performance found, from greater to lesser, was with THF/DMSO blend being greater and 1,2 trans dichloroethylene/DMSO blend being lesser:
THF/DMSO
Toluene/DMSO
Dioxalane/DMSO
1,2 trans dichloroethylene/DMSO THF and DMSO were tested in various ratios of THF/DMSO: 50/50, 100/0, 0/100, 75/25, 25/75, 90/10, 10/90, 82.5/17.5, and 17.5/82.5.

Example 2

Paint stripper formulations were tested in accordance with the present invention and are set forth in Table 3. The formulations were in a form of a liquid or an aerosol.

TABLE 3

| Components | Weight Percentage (%) |
|---|---|
| THF | 49.5 |
| Dye | 0.002 |
| Paraffin Wax (refined) | 0.25 |
| BHT | 0.025 |
| Acetone | 40 to 45 |
| Surfactant | 1 |
| Fumed Silica | 0 to 5 |
| Thickener | 0.1 to 1.25 |
| Diglycolamine | 0.5 |
| Aqua Ammonia | 5 |

Example 3

TABLE 4

Molar Volume of Primary Solvents

| Ingredient (wt. %) | Mw (g/mol) | Density (g/cm$^3$) | Molar Vol. (cm$^3$/mol) |
|---|---|---|---|
| Tetrahydrofuran | 72.1 | 0.888 | 81.23 |

TABLE 5

Miscibility Test of Primary Solvent with Aqua Ammonia (15 g total)

| Primary Solvent | Cosolvent Solvent | NH$_4$OH* | Appearance |
|---|---|---|---|
| 85% Tetrahydrofuran | — | 15% | Phase separation |
| 78.5% Tetrahydrofuran | 6.5% Methanol | 15% | Miscible - clear |

TABLE 5-continued

Miscibility Test of Primary Solvent with Aqua Ammonia (15 g total)

| Primary Solvent | Cosolvent Solvent | NH$_4$OH* | Appearance |
|---|---|---|---|
| 78.5% Tetrahydrofuran | 6.5% DMSO | 15% | Phase separation |
| 72% Tetrahydrofuran | 13% DMSO | 15% | Phase separation |

*30% NH$_4$OH in water

TABLE 6

Evaluation of Primary Solvents in Paint Remover*

| Ingredient | Ex. 1 (wt. %) |
|---|---|
| Tetrahydrofuran | 71.5 |
| Xylene | 5 |
| Tylose PSO810001 | 1.5 |
| Paraffin wax | 0.5 |
| Methanol | 6.5 |
| 30% Ammonia in H$_2$O | 15 |

TABLE 7

Stripping Performance of Primary Solvents in Paint Remover

| Example | Primary Solvent | Time to strip 2014 Chevy Cruise hood (min) | Paint Layers Removed |
|---|---|---|---|
| Ex. 1 | Tetrahydrofuran | 98 | All |

TABLE 8

Evaluation of Amines in Paint Remover

| Ingredient (wt. %) | Ex. 2 | Ex. 3 | Ex. 4 | Ex. 5 | Ex. 6 | Ex. 7 | Ex. 8 |
|---|---|---|---|---|---|---|---|
| Tetrahydrofuran | 93.75 | 67.5 | 81.75 | 72.5 | 87.75 | 87.75 | 87.75 |
| Calumet LVP 100 | 5 | 5 | 5 | 5 | 5 | 5 | 5 |
| Tylose PSO810001 | 0.75 | 0.75 | 0.75 | 0.75 | 0.75 | 0.75 | 0.75 |
| Paraffin wax | 0.5 | 0.5 | 0.5 | 0.5 | 0.5 | 0.5 | 0.5 |
| Methanol | | 6.25 | | 6.25 | | | |
| 30% Ammonia in H$_2$O | | 20 | | | | | |
| 50% Hydroxylamine in H$_2$O | | | 12 | | | | |
| 40% Dimethylamine in H$_2$O | | | | 15 | | | |
| Pyrrolidine | | | | | 6 | | |
| Ethanolamine | | | | | | 6 | |
| Dimethylethanolamine | | | | | | | 6 |

TABLE 9

Stripping Performance of Amines in Paint Remover vs. Molar Volume

| Example | Amine | Mw (g/mol) | Density (g/cm$^3$) | Molar Vol. (cm$^3$/mol) | Time to Strip 2004 Impala trunk (min) | Paint Layers Removed |
|---|---|---|---|---|---|---|
| Ex. 2 | None | | | | 44 | Clearcoat |
| Ex. 3 | Ammonia | 17.03 | 0.73 | 23.3 | 10 | All |
| Ex. 4 | Hydroxylamine | 33.03 | 1.21 | 27.3 | 11 | All |
| Ex. 5 | Dimethylamine | 45.08 | 0.67 | 67.3 | 15 | All |
| Ex. 7 | Ethanolamine | 61.08 | 1.01 | 60.5 | 21 | Clearcoat Basecoat Some primer |
| Ex. 6 | Pyrrolidine | 71.12 | 0.87 | 89 | 22 | Clearcoat Basecoat Some primer |
| Ex. 8 | Dimethylethanolamine | 89.14 | 0.89 | 100.2 | 32 | Clearcoat |

TABLE 10

Evaluation of Increased Amine Level in Paint Remover

| Ingredient | Ex. 9 (wt. %) | Ex. 10 (wt. %) | Ex. 11 (wt. %) | Ex. 12 (wt. %) | Ex. 13 (wt. %) |
|---|---|---|---|---|---|
| Tetrahydrofuran | 93.75 | 77.5 | 67.5 | 57.5 | 81.75 |
| Calumet LVP 100 | 5 | 5 | 5 | 5 | 5 |
| Tylose PSO810001 | 0.75 | 0.75 | 0.75 | 0.75 | 0.75 |
| Paraffin wax | 0.5 | 0.5 | 0.5 | 0.5 | 0.5 |
| Methanol | | 6.25 | 6.25 | 6.25 | |
| 30% Ammonia in H$_2$O | | 10 | 20 | 30 | |
| 50% Hydroxylamine in H$_2$O | | | | | 12 |

TABLE 11

Stripping Performance of Formulas with Increased Amine Level

| | Ex. 9 | Ex. 10 | Ex. 11 | Ex. 12 | Ex. 13 |
|---|---|---|---|---|---|
| Time to strip 2014 Cruise hood (min) | >180 | 140 | 150 | >180 | >180 |

TABLE 11-continued

Stripping Performance of Formulas with Increased Amine Level

|  | Ex. 9 | Ex. 10 | Ex. 11 | Ex. 12 | Ex. 13 |
|---|---|---|---|---|---|
| Paint Layers stripped | Clearcoat Basecoat | Clearcoat Basecoat some primer | All | All | Clearcoat Basecoat some primer |
| Time to strip 2013 Impala trunk | >180 | 32 | 30 | 40 | 45 |
| Paint Layers stripped | Clearcoat | All | All | All | All |

TABLE 12

Evaluation of Increased Cosolvent Solvent Level in Paint Remover

| Ingredient | Ex. 14 (wt. %) | Ex. 15 (wt. %) | Ex. 16 (wt. %) |
|---|---|---|---|
| Tetrahydrofuran | 74 | 64 | 54 |
| Calumet LVP 100 | 5 | 5 | 5 |
| Tylose PSO810001 | 0.75 | 0.75 | 0.75 |
| Paraffin wax | 0.5 | 0.5 | 0.5 |
| Methanol | 4.75 | 14.75 | 24.75 |
| 30% Ammonia in H$_2$O | 15 | 15 | 15 |

TABLE 13

Stripping Performance of Formulas with Increased Cosolvent Solvent Level

|  | Ex. 14 | Ex. 15 | Ex. 16 |
|---|---|---|---|
| Time to strip 2014 Cruise hood (min) | 145 | 210 | >360 |
| Paint Layers stripped | All | All | Clearcoat Basecoat Some primer |

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

The invention claimed is:

1. A paint remover composition comprising:
   tetrahydrofuran (THF) in an amount of 67.5% by wt. to 87.75% by wt based on the total weight of the composition;
   an amine with a molar volume of <100 cm$^3$/mol,
   a solvent that renders the composition miscible, wherein the solvent comprises at least one of a hydrocarbon, an alcohol, a glycol ether, benzene, xylene, toluene, dimethyl benzene, ethylbenzene, aliphatic hydrocarbon with 5 carbon or more, cycloaliphatic hydrocarbon with 5 carbon or more, methanol, ethanol, n-propanol, i-propanol, n-butanol, i-butanol, s-butanol, amyl alcohol, ethyleneglycol monomethylether, ethyleneglycol monoethylether, ethyleneglycol monopropylether, ethyleneglycol monobutyl ether, ethyleneglycol monohexylether, phenoxyethanol, propylene glycol monomethyl ether, propylene glycol monoethyl ether, propylene glycol monopropyl ether, propylene glycol monobutylether, propyleneglycol phenyl ether, diethyleneglycol monomethylether, diethyleneglycol monoethylether, diethyleneglycol monopropylether, diethyleneglycol monobutylether, diethyleneglycol monohexylether, diethyleneglycol phenylether, dipropyleneglycol monomethyl ether, dipropyleneglycol monoethyl ether, dipropyleneglycol monopropyl ether, dipropyleneglycol monobutyl ether, dipropyleneglycol phenyl ether, dipropyleneglycol dimethylether, tripropyleneglycol monomethyl ether, tripropyleneglycol monobutylether, ethylene glycol, propylene glycol, glycerol, propanediol, butanediol, 2-methylpropanediol, or a combination thereof, and
   water in an amount up to 20% by wt. based on the weight of the composition.

2. The composition according to claim 1, wherein the amine is present in an amount of 1 weight % to 10 weight %, wherein the weight percentages are based on the weight of the composition.

3. The composition according to claim 1, wherein the amine is selected from the group consisting of ammonia, hydroxylamine, dimethylamine, ethanolamine, pyrrolidine, and a combination thereof.

4. The composition according to claim 1, wherein the molar volume of the amine is <30 cm$^3$/mol.

5. The composition according to claim 1, wherein the amine is selected from the group consisting of ammonia, hydroxylamine, and a combination thereof.

6. The composition according to claim 1, further comprising a solvent evaporation retarder.

7. The composition according to claim 1, wherein the solvent evaporation retarder is a paraffin wax.

8. The composition according to claim 7, wherein paraffin wax is present in an amount from 0.25 weight % to 0.8 weight %, based on the weight of the composition.

9. The composition according to claim 1, further comprising a cellulosic thickener.

10. The composition according to claim 1, wherein the cellulosic thickener is selected from the group consisting of hydroxypropyl methyl cellulose, hydroxypropyl cellulose, and a combination thereof.

11. The composition according to claim 1, further comprising an amine containing corrosion inhibitor.

12. The composition according to claim 1, wherein water is present in an amount up to 14% by weight based on the total weight of the composition.

13. The composition according to claim 1, wherein water is present in an amount up to 10.5% by weight based on the total weight of the composition.

14. The composition according to claim 1, wherein water is present in an amount up to 7% by weight based on the total weight of the composition.

15. The composition according to claim 3, wherein water is present in an amount up to 14% by weight based on the total weight of the composition.

16. The composition according to claim 3, wherein water is present in an amount up to 10.5% by weight based on the total weight of the composition.

17. The composition according to claim 3, wherein water is present in an amount up to 7% by weight based on the total weight of the composition.

18. The composition according to claim 1, wherein water is present in an amount up to 6% by weight based on the total weight of the composition.

19. The composition according to claim 1, wherein water is present in an amount up to 4.5% by weight based on the total weight of the composition.

20. The composition according to claim 1, wherein water is present in an amount up to 3% by weight based on the total weight of the composition.

* * * * *